United States Patent
Charron et al.

(10) Patent No.: US 9,127,554 B2
(45) Date of Patent: Sep. 8, 2015

(54) GAS TURBINE ENGINE WITH RADIAL DIFFUSER AND SHORTENED MID SECTION

(75) Inventors: Richard C. Charron, West Palm Beach, FL (US); Matthew D. Montgomery, Jupiter, FL (US)

(73) Assignee: Siemens Energy, Inc., Orlando, FL (US)

( * ) Notice: Subject to any disclaimer, the term of this patent is extended or adjusted under 35 U.S.C. 154(b) by 394 days.

(21) Appl. No.: 13/602,422

(22) Filed: Sep. 4, 2012

(65) Prior Publication Data

US 2014/0060000 A1    Mar. 6, 2014

(51) Int. Cl.
*F01D 9/02* (2006.01)
*F01D 9/04* (2006.01)
*F02C 3/14* (2006.01)
*F23R 3/46* (2006.01)

(52) U.S. Cl.
CPC ...... *F01D 9/023* (2013.01); *F01D 9/02* (2013.01); *F01D 9/04* (2013.01); *F02C 3/14* (2013.01); *F23R 3/46* (2013.01); *Y02T 50/671* (2013.01)

(58) Field of Classification Search
CPC .. F23R 2900/033342; F23R 3/46; F02C 3/14; F01D 9/023; F01D 9/02; F01D 9/04
USPC ......... 60/39.37, 722, 751, 752, 805; 415/207, 415/208.1, 211.2, 224
See application file for complete search history.

(56) References Cited

U.S. PATENT DOCUMENTS

| | | | | | |
|---|---|---|---|---|---|
| 3,088,279 | A | * | 5/1963 | Diedrich | 60/804 |
| 3,631,674 | A | * | 1/1972 | Taylor | 60/804 |
| 4,896,499 | A | * | 1/1990 | Rice | 60/792 |
| 5,252,860 | A | * | 10/1993 | McCarty et al. | 290/40 R |
| 7,721,547 | B2 | | 5/2010 | Bancalari et al. | |
| 2003/0010014 | A1 | * | 1/2003 | Bland et al. | 60/39.37 |
| 2004/0088990 | A1 | * | 5/2004 | Little et al. | 60/772 |
| 2007/0017225 | A1 | * | 1/2007 | Bancalari et al. | 60/752 |
| 2007/0175220 | A1 | * | 8/2007 | Bland | 60/751 |
| 2007/0271923 | A1 | * | 11/2007 | Dawson | 60/751 |
| 2009/0133377 | A1 | | 5/2009 | Kenyon et al. | |
| 2009/0272116 | A1 | * | 11/2009 | Bland | 60/737 |
| 2010/0077719 | A1 | | 4/2010 | Wilson et al. | |
| 2011/0203282 | A1 | | 8/2011 | Charron et al. | |
| 2014/0060001 | A1 | * | 3/2014 | Beeck | 60/39.37 |

FOREIGN PATENT DOCUMENTS

| | | | |
|---|---|---|---|
| EP | 0789195 | A1 | 8/1997 |
| EP | 1270874 | A1 | 6/2001 |

* cited by examiner

*Primary Examiner* — William H Rodriguez
*Assistant Examiner* — Scott Walthour (57) ABSTRACT

An industrial gas turbine engine (10), including: a can annular combustion assembly (80), having a plurality of discrete flow ducts configured to receive combustion gas from respective combustors (82) and deliver the combustion gas along a straight flow path at a speed and orientation appropriate for delivery directly onto the first row (56) of turbine blades (62); and a compressor diffuser (32) having a redirecting surface (130, 140) configured to receive an axial flow of compressed air and redirect the axial flow of compressed air radially outward.

20 Claims, 7 Drawing Sheets

GAS TURBINE ENGINE WITH RADIAL DIFFUSER AND SHORTENED MID SECTION

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to industrial gas turbine engines with can annular combustion assemblies configured in a manner that enables a shorter rotor shaft, and a radial diffuser that improves aerodynamics in the shortened gas turbine engines.

BACKGROUND OF THE INVENTION

Industrial gas turbines are used primarily to generate electrical power, where other gas turbine engines may have other primary purposes. For example, aero gas turbine engines are designed to be lightweight, and as small as possible in order to provide propulsion for aircraft. Aeroderivative gas turbine engines are aero gas turbine engines that have been modified to generate electrical power. Due to their original aero purpose, the aeroderivative engines are lighter than the industrial gas turbine engines, and therefore portable, but they are less robust and generate less electrical power. With little need to be light weight, portable, or aerodynamic, industrial gas turbines are generally made of heavy duty components with a primary concern being long engine life and electrical power output. This often results in an industrial gas turbine engine that is heavier and bulkier than aero or aeroderivative counterparts. This bulk yields longer engine life and greater output capacity, but also creates design and maintenance complexity and cost.

BRIEF DESCRIPTION OF THE DRAWINGS

The invention is explained in the following description in view of the drawings that show.

DETAILED DESCRIPTION OF THE INVENTION

The present inventors have identified a way to shorten a rotor length in an industrial gas turbine engine using a can annular combustor system. The can combustors of a can annular combustion system can be reconfigured to a position more radially outward, axially closer to the turbine, and having a combustor longitudinal axis at a lesser angle with respect to a plane defined by a turbine inlet annulus. By reorienting the combustor cans in this manner, the diameter of the combustion assembly (which includes all of the combustors and the structures between the combustors and the turbine) increases. The present inventors have recognized that a length along an axis of the engine taken up after reorienting the combustion assembly may be decreased in comparison to a length taken up using traditionally oriented can annular combustors. This decrease in combustor section length and associated reduction in engine length can be significant. For example, in smaller industrial gas turbine engines having engine lengths of 5-6 meters from a leading edge of a first row of compressor airfoils (either vanes or blades, whichever is first) to a trailing edge of a last row of turbine airfoils (either vanes or blades, whichever is last), the reduction in axial length of the combustion assembly, and therefore the engine length, may be about ½ meter in certain emerging technology designs. In larger industrial gas turbine engines having engine lengths of 10-12 meters, the reduction in axial length may be about 1 meter. Other engine sizes, including industrial gas turbine engines having an engine length on the order of less than two meters will experience a comparable length reduction as well. As used herein, a combustor section length is a length between a trailing edge of a last row of compressor airfoils and a leading edge of first row of turbine blades. In an industrial gas turbine engine with more than one turbine, it is the first row of turbine blades of the first turbine that is being referred to herein. The first row of stationary vanes upstream of and adjacent to the first row of rotating turbine blades is considered herein to be part of the combustion section.

The focus on heavy duty components in industrial gas turbine engines has resulted in long, heavy rotor shafts and associated bearings. As rotor shaft size increases, so do rotor shaft dynamics. Increased rotor dynamics require increasingly complex rotor shaft design as well as bearings sized to handle the rotor shafts. Consequently, any reduction in rotor shaft size will result in smaller rotor shafts, less complex rotor shaft designs, and smaller bearings, each of which reduce cost and complexity. The result of applying the teachings herein is an industrial gas turbine engine that is shorter but which retains longevity and power output yet will cost less to build and maintain.

The present inventors have further recognized that compressed air aerodynamics, and thus engine performance, can be improved by utilizing a radial diffuser to direct compressed air exiting the compressor from an axial travel direction to a more radial travel direction. The radial diffuser may be particularly useful in one emerging combustor technology design for can annular gas turbine engines that includes structures that direct combustion gas from a point of combustion to a first row of turbine blades, without a need for a row of vanes at the end of the structure (i.e. upstream of the first row of turbine blades), where the structures properly orient and accelerate the combustion gas. Each flow directing structure includes a combustor can and a respective flow duct that directs combustion gas from the combustor to the first row of turbine blades along a straight flow path and at a proper speed and orientation without a first row of vanes. The combustion assembly includes all of the flow directing structures, one for each point of combustion. One such combustion assembly is disclosed in U.S. Pat. No. 7,721,547 to Bancalari et al. issued May 25, 2010, incorporated in its entirety herein by reference. Another such combustion assembly that also includes an annular chamber immediately upstream of the first row of turbine blades is disclosed in U.S. Pre-Grant Publication Number 2010/0077719 to Wilson et al., filed Apr. 8, 2009, which is incorporated in its entirety herein by reference. In particular, because the combustor inlet is disposed so much farther radially outward in the reoriented configuration, and because the compressor outlet is disposed closer to an aft wall of the compressor section in this emerging combustor technology, a radial diffuser may provide a dramatic improvement in aerodynamic performance. Any industrial gas turbine engine utilizing such an emerging technology combustor can benefit from the radial diffuser. This includes smaller industrial gas turbine engines having an engine length of less than two meters and a rated electrical power output of less than 1 MW to those having an engine length of over twelve meters and a rated electrical power output of over 100 MW.

Figure 1:
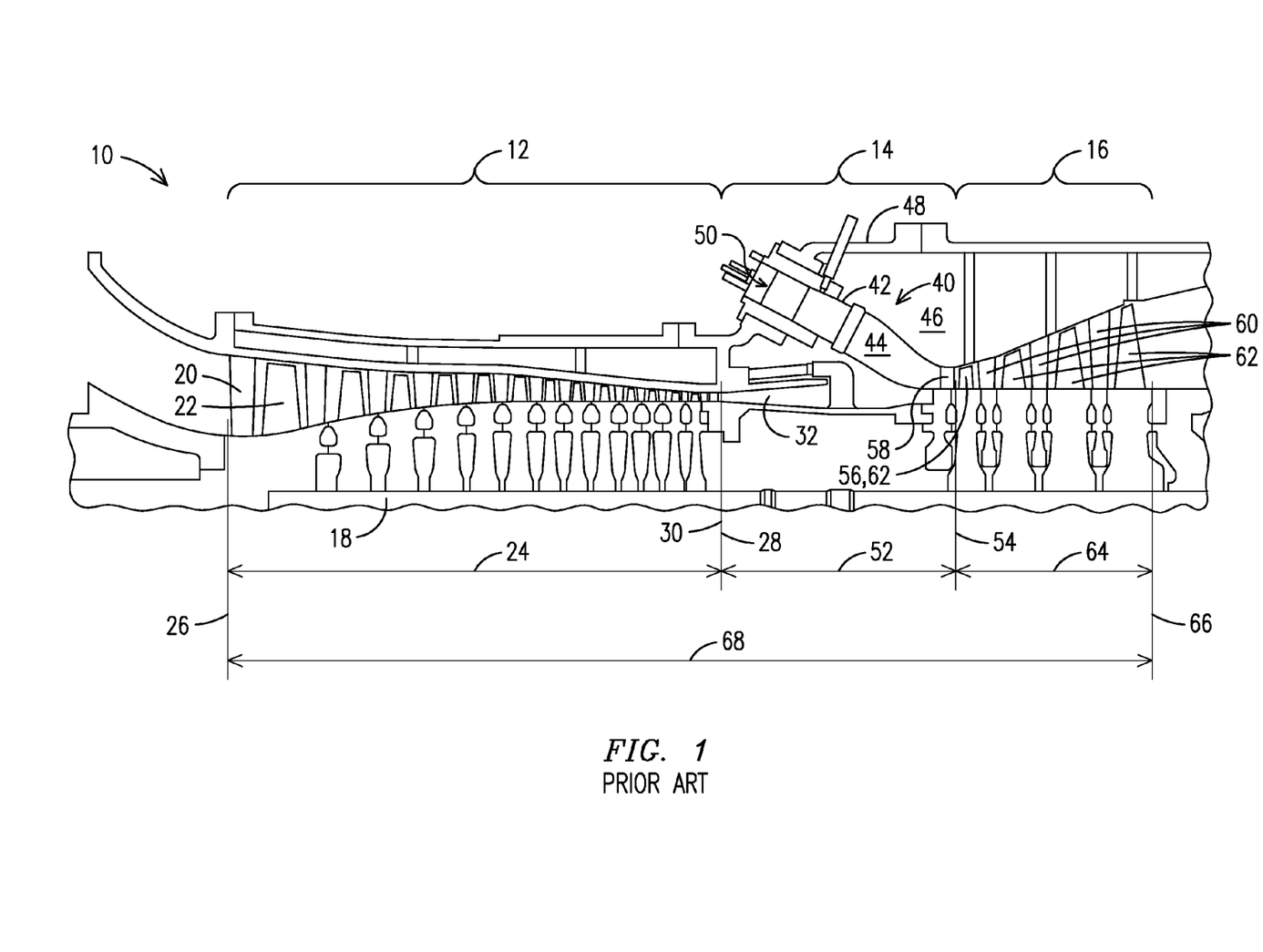
FIG. 1 is a cross section of an industrial gas turbine engine with a conventional combustion system.

FIG. 1 shows a cross section of a industrial gas turbine engine 10 of the prior art including a compressor section 12, a conventional combustion section 14, a turbine section 16, and a conventional rotor shaft 18. The compressor section 12 includes compressor vanes 20 and compressor blades 22. As used herein, a compressor section length 24 spans from a leading edge 26 of (a base of) the first row of compressor airfoils, (be they compressor vanes 20 or compressor blades 22) to a trailing edge 28 of (a base of) the last row of compressor airfoils, (be they compressor vanes 20 or compressor blades 22). Secured to an aft end 30 of the compressor section 12 is a diffuser 32 configured to receive compressed air from the compressor section 12 and diffuse it prior to delivering it to the conventional combustion section 14.

The conventional combustion section 14 includes a combustion assembly 40 including individual combustor cans 42 and respective conventional transition ducts 44 configured to receive combustion gas from the respective combustor cans 42 and deliver it to the turbine section 16. The conventional combustion section 14 also includes a plenum 46 defined by a conventional rotor combustion section casing 48, where the plenum 46 receives diffused compressed air from the diffuser 32, and acts as a pressure vessel of sorts to contain the diffused compressed air as it works its way toward a combustor inlet 50 of each combustor can 42. As used herein, a conventional combustion section length 52 spans from the trailing edge 28 of (a base of) the last row of compressor airfoils, (be they compressor vanes 20 or compressor blades 22) to a leading edge 54 of (a base of) a first row 56 of turbine blades. The conventional combustion section length 52 includes a row of vanes 58 at the end of the conventional transition duct 44, upstream of and adjacent to the first row 56 of turbine blades.

The turbine section 16 includes turbine vanes 60 and turbine blades 62. As used herein, a turbine section length 64 spans from the leading edge 54 of (a base of) the first row 56 of turbine blades to a trailing edge 66 of (a base of) the last row of turbine airfoils (be they turbine vanes 60 or turbine blades 62).

In the prior art industrial gas turbine engine shown it can be seen that the conventional combustion section length 52 is approximately 23% of a conventional engine length 68 which, as used herein, spans from the leading edge 26 of the first row of compressor airfoils to the trailing edge 66 of the last row of turbine airfoils. The inventors are unaware of any prior art industrial gas turbine engine using a can annular combustion arrangement about a single rotor shaft and which produces at least 75 MW where the conventional combustion section length 52 is less than approximately 23% of the conventional engine length 68. The inventors propose to reduce that percentage to not more than 20%. For a given industrial gas turbine engine 10, the inventors propose to reduce the engine length by up to 8% to 10% by moving the conventional combustor cans to a more radial position. In one exemplary embodiment described in further detail herein the inventors replace the conventional combustion assembly 40 with the emerging technology (a.k.a. reconfigured) combustion assembly but leaving the compressor section 12 and the turbine section 16 the same in relevant part.

Figure 2:
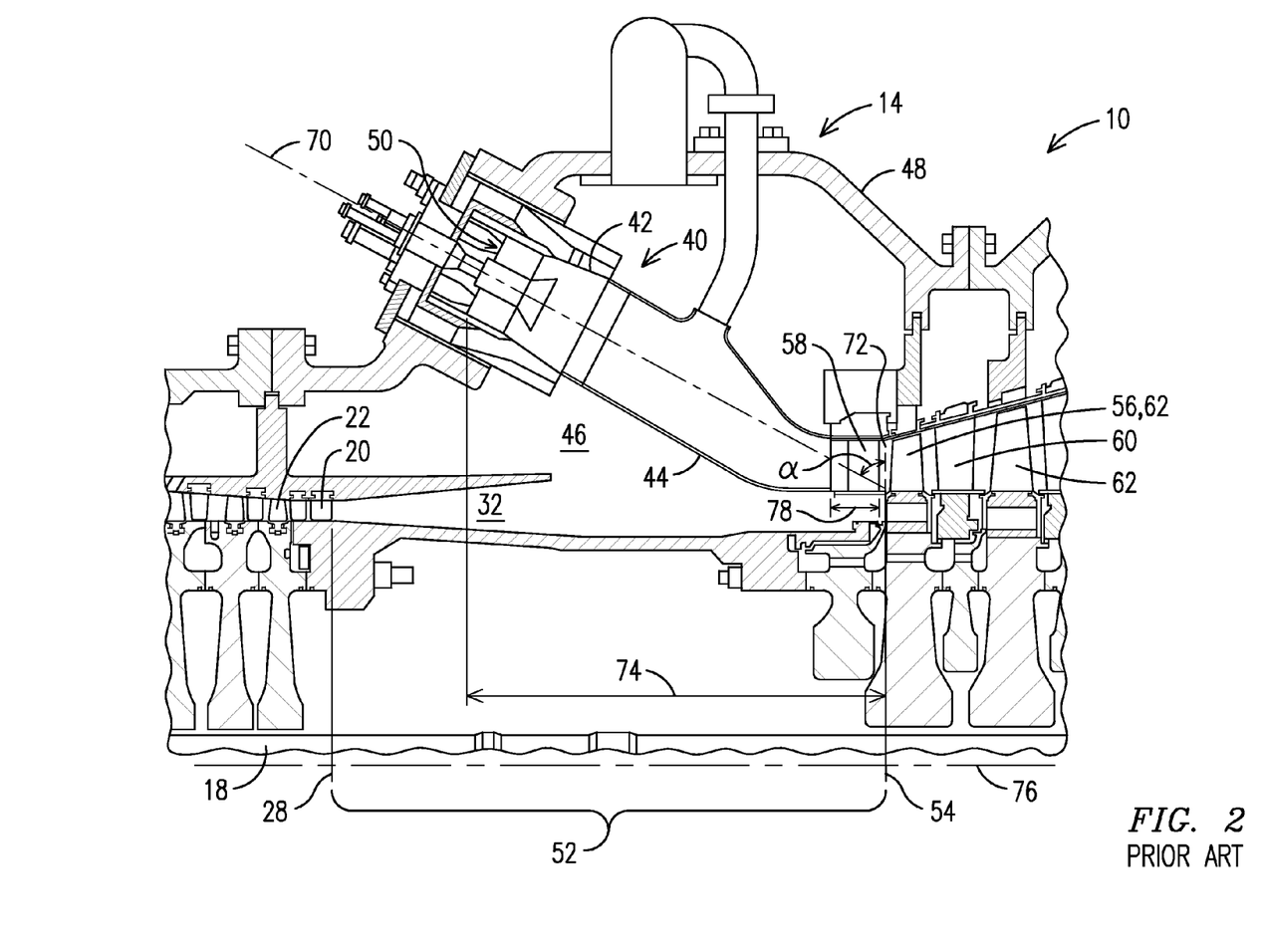
FIG. 2 is a cross section of the conventional combustion section of FIG. 1.

FIG. 2 shows the conventional combustion section 14 of the industrial gas turbine engine 10 of FIG. 1. It can be seen that the orientation of the combustor cans 42 and the conventional transition duct 44 dictates the conventional combustion section length 52. In the configuration shown a central axis 70 of the conventional combustor can 42 forms an angle α with a plane defined by a turbine inlet annulus 72 of approximately 60 degrees. As used herein, the turbine inlet annulus is an annulus oriented perpendicular to the gas turbine engine longitudinal axis 76. Its inner diameter is defined by a sweep of the leading edge 54 of (the base of) the first row 56 of turbine blades and defines an inner boundary for the combustion gas flowing thereby. Its outer diameter is axially aligned with respect to the gas turbine engine longitudinal axis 76, but disposed radially outward of the inner diameter and defines an outer boundary for the combustion gas entering the turbine. Thus, the turbine inlet annulus 72 lies within/defines a turbine inlet annulus plane that is perpendicular to the gas turbine engine longitudinal axis 76.

The conventional combustion assembly 40 takes up a conventional combustion system axial length 74 (from a fore end of the combustor inlet 50 to the leading edge 54 of the first row 56 of turbine blades), along the gas turbine engine longitudinal axis 76. It can be seen that that the conventional combustion system axial length 74 is almost as long as the conventional combustion section length 52 and has a great degree of influence on the magnitude of the conventional combustion section length 52. It can also be seen that the row of vanes 58 at the end of the conventional transition duct 44 occupy a vane length 78 which the conventional rotor shaft 18 must accommodate.

Figure 3:
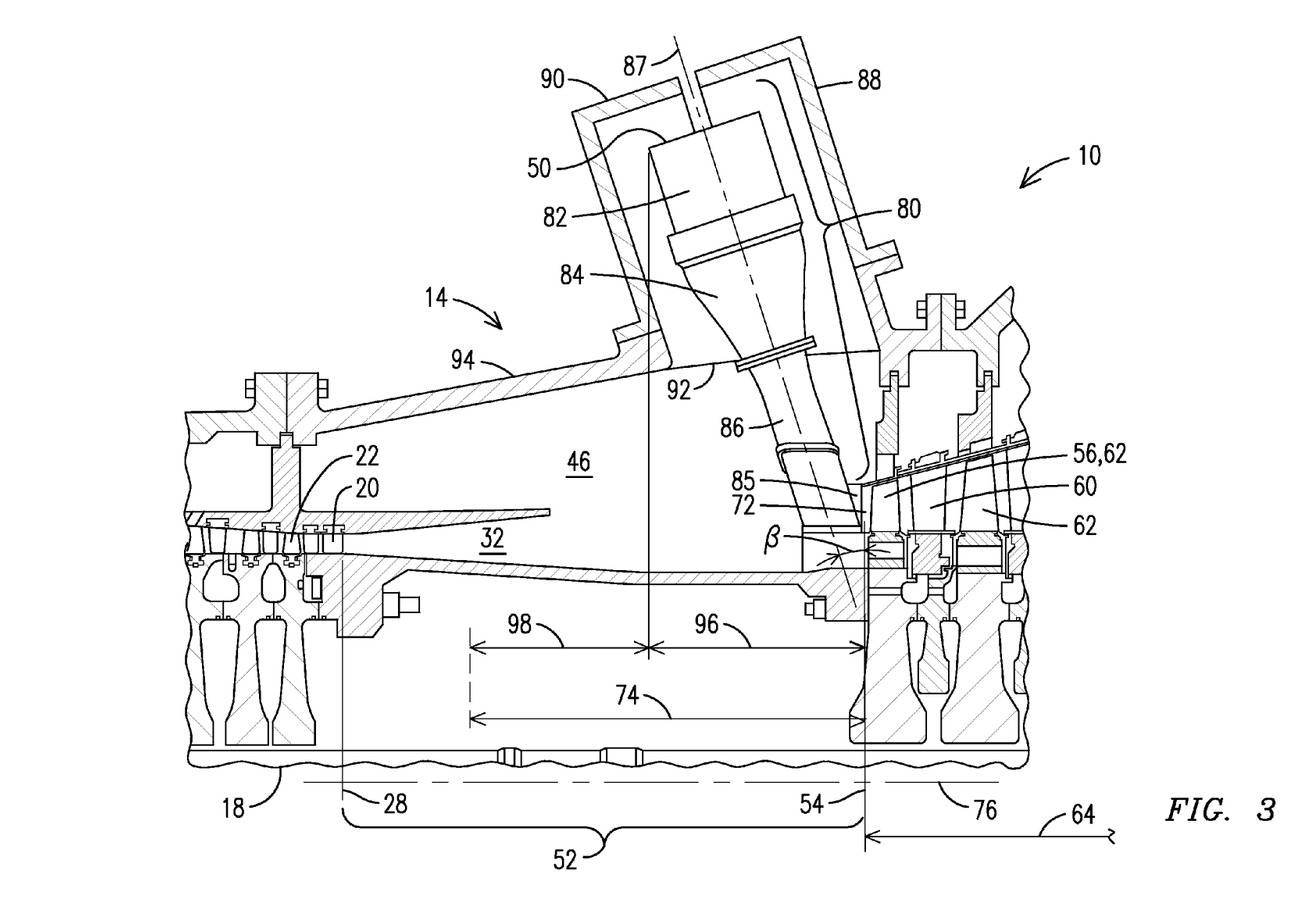
FIG. 3 is a cross section of a combustion section of the industrial gas turbine of FIG. 1 but with a reconfigured combustion assembly.

FIG. 3 shows the industrial gas turbine engine 10 of FIG. 1, but with the conventional combustion assembly 40 replaced with an exemplary embodiment of a reconfigured combustion assembly 80 of the emerging technology type described above, including a combustor 82 and in the exemplary embodiment shown, and a cone 84 and an integrated exit piece ("IEP") 86 for each combustor 82. The cone 84 is configured to receive combustion gas from a respective combustor 82 and guide it into the IEP 86. In turn the IEP directs the combustion gas onto the first row 56 of turbine blades at a speed and orientation proper for delivery directly onto the first row 56 of turbine blades. The cone 84 and the IEP 86 together may be considered a flow duct. In one exemplary embodiment the can annular combustion assembly 80 comprises an annular chamber 85 configured to merge the plurality of discrete flow ducts, and therefore flow paths, into a single, annular flow path immediately upstream of the first row 56 of turbine blades. The annular chamber 85 is formed from portions of adjacent IEP's 86 working together. The reconfigured combustion assembly 80 thereby dispenses with the vanes 58 at the end of the conventional transition duct 44 that would otherwise orient and accelerate the combustion gas for delivery onto the first row 56 of turbine blades.

Also visible in FIG. 3 is a reconfigured combustion engine casing 88 that may also be used instead of the conventional combustion section casing 48. The reconfigured combustion engine casing 88 may be configured to reduce a volume enclosed thereby. By reducing it size, and therefore its surface area, the pressure acting on the reconfigured combustion engine casing 88 generates less total force. Consequently, the reconfigured combustion engine casing 88 need not be as structurally reinforced as the conventional combustion section casing 48. Further, the reconfigured combustion engine casing 88 may include discrete top hats 90 configured to encase respective combustors 82 in a further effort to decease the enclosed volume and pressure-related forces associated there with. These top hats 90 may form circumferentially positioned top hat openings 92 through an annular portion 94 of the reconfigured combustion engine casing 88, where the annular portion 94 spans from the compressor section 12 to the turbine section 16. In such a configuration and for a given combustor 82 the compressed air would be contained in the plenum 46 by the annular portion 94 and would travel through the top hat opening 92 and into the top hat 90 on its way to the combustor inlet 50.

The inventors have recognized that the orientation of the combustor cans 42 in the reconfigured combustor assembly 80 is more radially outward, closer to the turbine, and with a smaller angle β between a combustor longitudinal axis 87 and the plane defined by the turbine inlet annulus 72. This smaller angle β, from 35 degrees and below, results in the reconfigured combustion assembly 80 with a reconfigured combustion system axial length 96. It can be seen that the reconfigured combustion system axial length 96 takes up a significantly smaller portion of the conventional combustion section length 52 (shown as a dotted line) than did the conventional combustion system axial length 74 of the prior art. This leaves a remnant length 98 of the conventional combustion section length 52. The reconfigured combustion assembly is not limited to that which is shown in FIG. 3, but may include traditional combustor cans 42 and transitions 44 but reoriented to the angle β of 35 degrees or below as well.

It is expected that this configuration would operate with the conventional rotor shaft 18 and combustor section 48 casing without any problems brought on by the reconfigured combustion assembly 80. However, the remnant length 98 and the vane length 78 are lengths that contribute to a conventional engine length 68 that the conventional rotor shaft 18 must accommodate. (Although it is known that in certain prior art gas turbine engines the conventional rotor shaft 18 may extend beyond the compressor section 12 and the turbine section 16, for purposes simplicity in explanation, as used herein the conventional rotor engine length equals the conventional engine length 68.) The present inventors have recognized that if the remnant length 98 and/or the vane length 78 can be removed from the design, the conventional rotor shaft 18, the conventional combustion section 14, and the conventional combustion section casing 48 can be shortened, and this will reduce the rotor shaft dynamics, and associated design, manufacturing, and maintenance costs.

Figure 4:
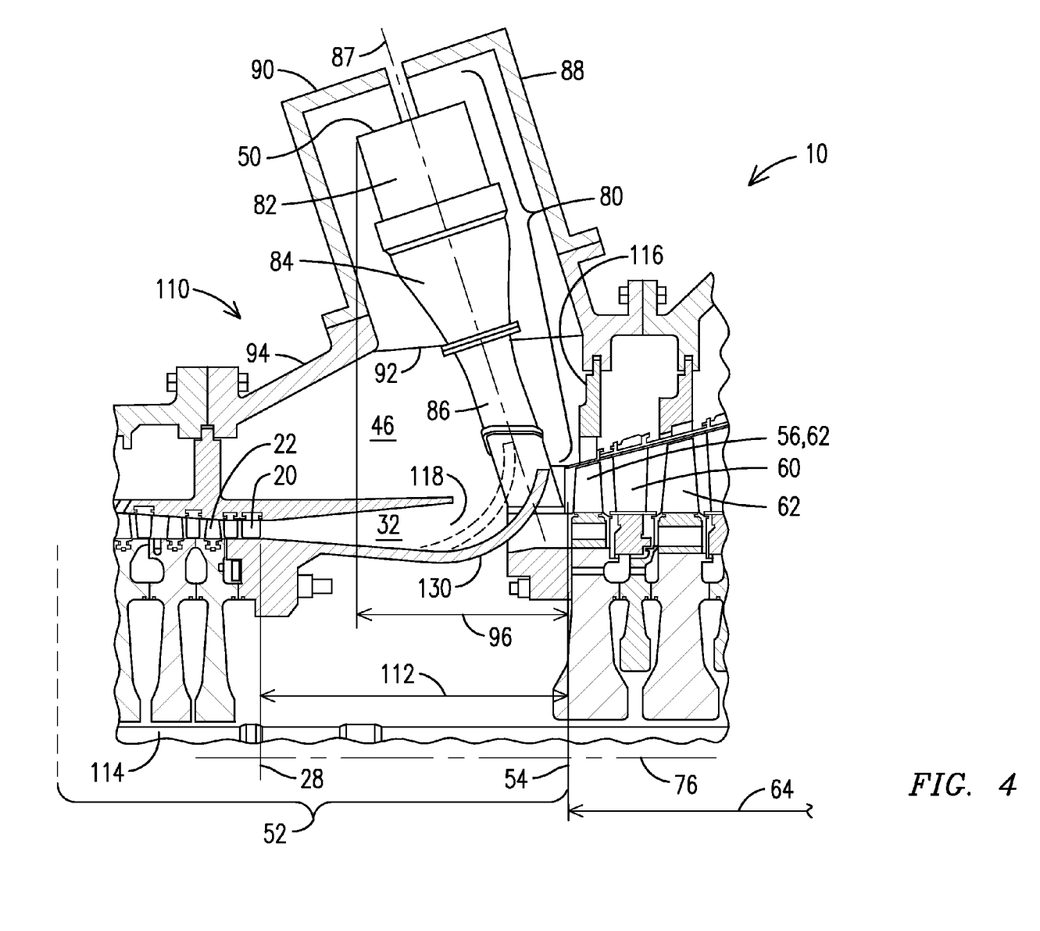
FIG. 4 is a cross section of a reconfigured combustion section including the reconfigured combustion system of FIG. 3 having an exemplary embodiment of a radial diffuser.

FIG. 4 shows an industrial gas turbine 10 where the conventional combustion section 14 has been shortened to be a reconfigured combustion section 110 of reconfigured combustion system length 112. It can be seen that the reconfigured combustion system axial length 96 takes up a much greater percentage of the reconfigured combustion system length 112, and is therefore a much more efficient use of space. In order to shorten the conventional combustion section 14 the conventional rotor shaft 18 is shortened to a reconfigured rotor shaft 114. Since the compressor section 12 and the turbine section 16 may remain the same length, the shortening of the conventional combustion section 14 results in a reconfigured rotor shaft 114 with a reconfigured rotor shaft engine length that is shorter than that of the conventional rotor shaft 18. As a result the entire industrial gas turbine engine 10 has a shorter reconfigured engine length as well.

The reconfigured combustion section 110 necessarily moves the diffuser 32 axially closer to an aft side 116 of the reconfigured combustion section 110. Consequently, compressed air exiting a diffuser outlet 118 is likely to continue traveling somewhat axially until encountering an obstruction such as the IEP 86 or the reconfigured combustion section aft side 116 itself. Combustion efficiency is very dependent on a smooth, predictable, and efficient flow of compressed air through the plenum 46. Consequently, any obstructions introduce turbulence, local variations in pressure, and pressure loss, each of which reduce combustion efficiency and may increase harmful emissions.

While it is believed that the gas turbine engine would operate with the diffuser 32 so located, in one exemplary embodiment the inventors have applied a radial diffuser wall 130 configured to receive axially flowing compressed air exiting the diffuser outlet 118 and redirect it in a more radial direction. The radial diffuser wall 130 may direct the compressed air anywhere from slightly radially, to a destination radially outside of the annular chamber 85, to perpendicular to the gas turbine engine longitudinal axis 76. The radial diffuser wall 130 may even direct the flow of compressed air more than 90 degrees such that it flows radially outward and backwards with respect to the axial flow exiting the diffuser outlet 118, such that direction of travel is toward the compressor section 12 as well as radially outward. In this manner the radial diffuser wall 130 can direct circumferential portions of the flow of compressed air directly into the top hat openings 92. In an exemplary embodiment shown by a dashed line, the radial diffuser wall 130 directs the flow of compressed air parallel to the combustor longitudinal axis 87. In an exemplary embodiment the radial diffuser wall 130 may be a single sheet and may undulate axially along its circumference from between adjacent IEP's 86 to upstream of the IEP's 86. In another exemplary embodiment the radial diffuser wall may be disposed primarily between the adjacent IEP's 86 and have openings or simply not extend proximate the IEP's 86.

Figure 5:
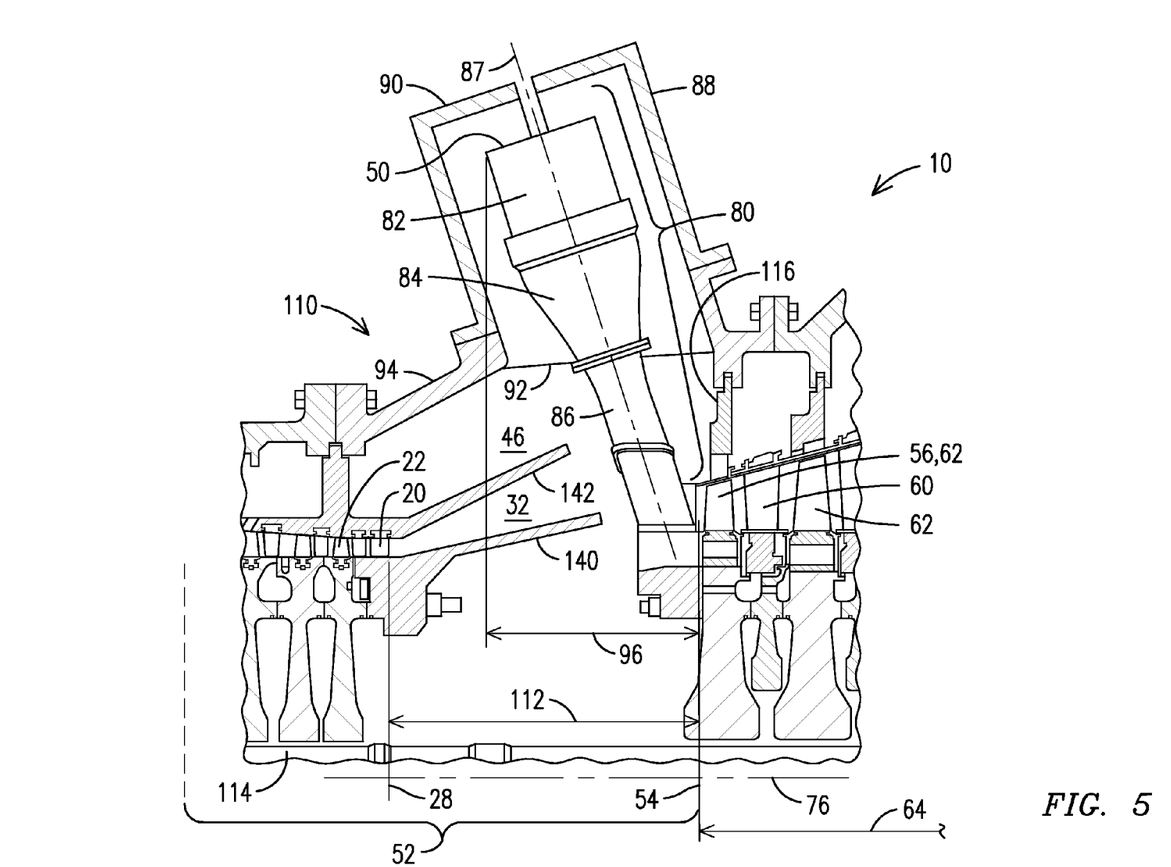
FIG. 5 is a cross section of the reconfigured combustion section of FIG. 4 including an alternate exemplary embodiment of a radial diffuser.

FIG. 5 depicts an alternate exemplary embodiment of the diffuser 32. Instead of adding a radial diffuser wall 132, the diffuser 32 itself is modified to include a straight diffuser radially inner wall 140 and a straight diffuser radially outer wall 142. In this exemplary embodiment the diffuser radially inner wall 140 may take a conical shape such that it expands along the gas turbine engine longitudinal axis 76. The straight radially outer wall 142 may also take a conical shape such that it also expands in along the gas turbine engine longitudinal axis 76. The straight radially outer wall 142 may be configured to expand at a greater rate than the straight diffuser radially inner wall 140 such that the divergence provides a diffusive effect for the compressed air therein. The rate of divergence may vary as necessary. It is likewise possible for the diffuser 32, and in particular the straight diffuser radially inner wall 140, to include geometry meant to guide compressed air around the IEPs 86, as opposed to directing compressed air directly onto an upstream surface 144 of the IEP.

Figure 6:
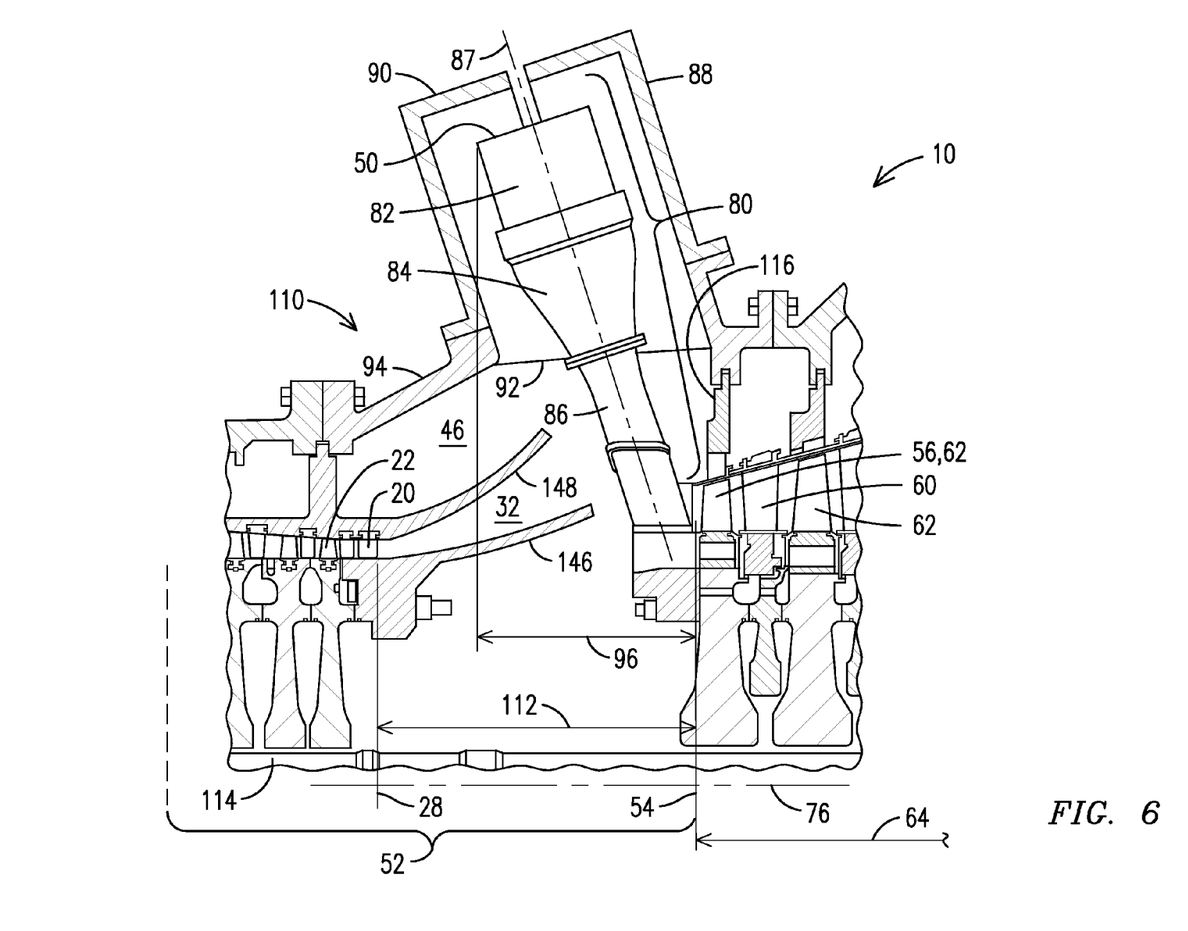
FIG. 6 is a cross section of the reconfigured combustion section of FIG. 4 including another alternate exemplary embodiment of a radial diffuser.

FIG. 6 depicts another alternate exemplary embodiment of the diffuser 32, where a curved diffuser radially inner wall 146 and a curved diffuser radially outer wall 148 may be used. In this exemplary embodiment the curved diffuser radially inner wall 146 may take an arcuate shape such that it expands radially outward along the gas turbine engine longitudinal axis 76. The curved diffuser radially outer wall 148 may also take an arcuate shape such that it expands radially outward along the gas turbine engine longitudinal axis 76. The curved diffuser radially outer wall 148 may be configured to increase its radius at a greater rate than the curved diffuser radially inner wall 146. The rate of divergence may vary as necessary.

It is likewise possible for the diffuser 32, and in particular the curved diffuser radially inner wall 146 to include geometry meant to guide compressed air around the IEPs 86, as opposed to directing compressed air directly onto an upstream surface 144 of the IEP.

Further, a combination of the curved diffuser and the conical diffuser may be used. For example, one wall may be curved and another straight, or one or both walls may include a curved and/or a straight section. Various exemplary embodiments using straight and/or curved walls may be used without limitation so long as the compressed air is redirected from essentially axial to more radially outward.

Figure 7:
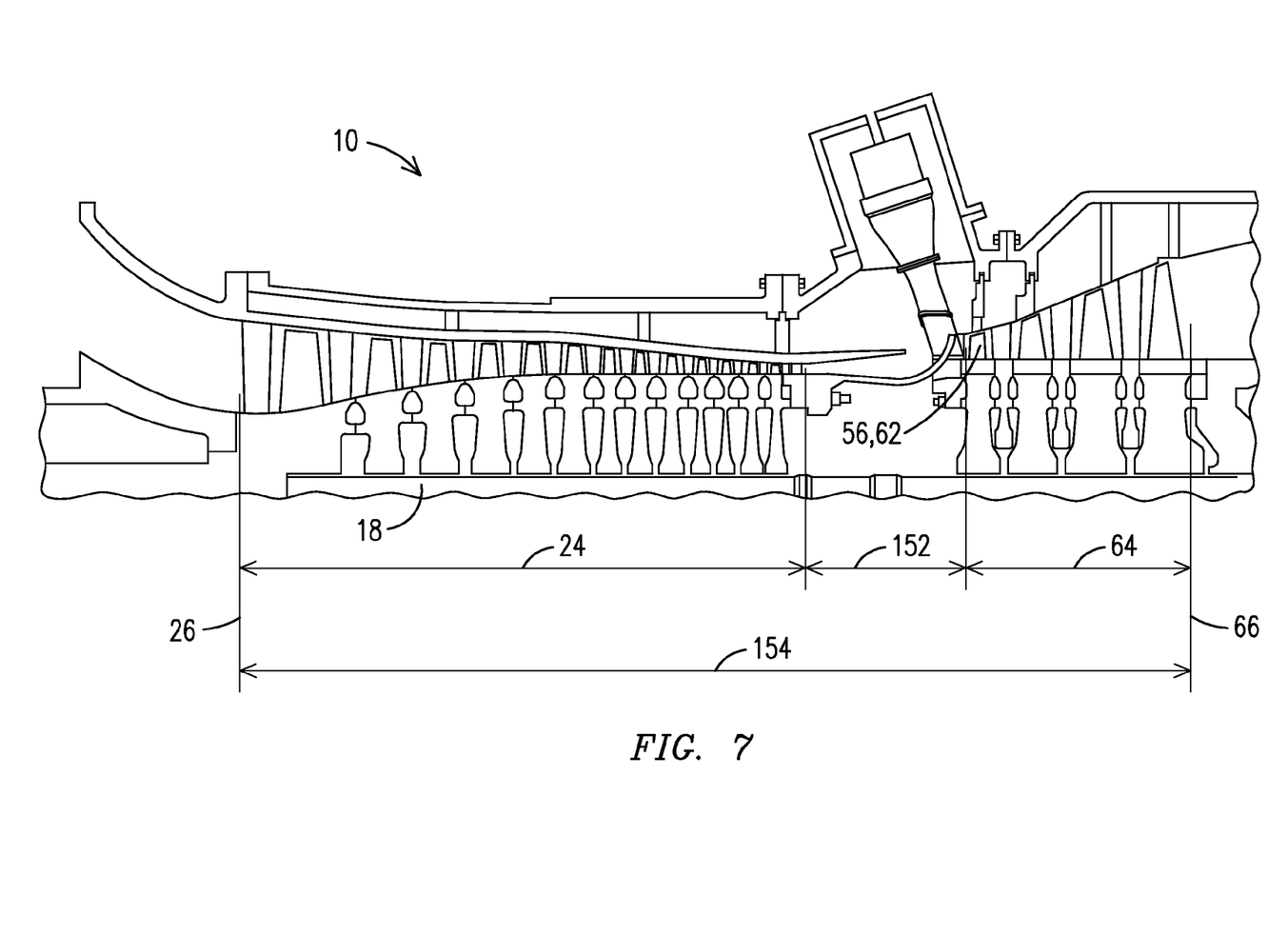
FIG. 7 is a cross section of the reconfigured gas turbine engine of FIG. 4.

FIG. 7 shows the gas turbine engine of FIG. 1 but with the conventional combustion assembly 40 replaced by the reconfigured combustion assembly 80. From this it can be seem that the compressor section length 24 remains the same. The turbine section length 64 also remains the same. However, the reconfigured combustion section length 152 is shorter than the conventional combustion section length 52. The shorter combustion section length 152 necessarily results in a reconfigured engine length 154 that is significantly shorter than the conventional engine length 68. Consequently, the reconfigured rotor length may likewise be significantly reduced. This, in turn, reduces design, manufacturing, and maintenance costs for the rotor shaft and bearings and related systems, and with the inclusion of the radial diffuser the aerodynamics within the combustion section are not substantially negatively impacted, and therefore the disclosure herein represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An industrial gas turbine engine, comprising:
   a can annular combustion assembly, comprising a plurality of discrete flow ducts configured to receive combustion gas from respective combustors and deliver the combustion gas along a straight flow path at a speed and orientation appropriate for delivery directly onto a first row of turbine blades without guide vanes, and an annular chamber configured to merge the plurality of discrete flow ducts into a single, annular flow duct defining an annular flow path immediately upstream of the first row of turbine blades; and
   a compressor diffuser positioned at a downstream end of an axial compressor and configured to receive an axial flow of compressed air from the axial compressor, the compressor diffuser comprising a diffuser radially outer wall, a diffuser radially inner wall, and a diffuser outlet there between, the diffuser radially inner wall comprising a redirecting surface configured to receive the axial flow of compressed air and redirect the axial flow of compressed air radially outward along a path that bypasses the annular chamber;
   wherein the axial flow of compressed air exiting the downstream end of the axial compressor comprises all compressed air exiting the downstream end of the axial compressor;
   wherein the redirecting surface extends in a radial direction, relative to a longitudinal axis of the industrial gas turbine engine, beyond a radially inner surface of the annular chamber, and into a plenum surrounding the can annular combustion assembly.

2. The industrial gas turbine engine of claim 1, wherein a combustion section length between a trailing edge of a last row of compressor airfoils and a leading edge of the first row of turbine blades is not more than 20% of an engine length between a leading edge of a first row of compressor airfoils and a trailing edge of a last row of turbine airfoils.

3. The industrial gas turbine engine of claim 1, wherein an engine length between a leading edge of a first row of compressor airfoils and a trailing edge of a last row of turbine airfoils is at least 5 meters and a combustion section length between a trailing edge of a last row of compressor airfoils and a leading edge of the first row of turbine blades is less than 1 meter.

4. The industrial gas turbine engine of claim 1, wherein an engine length between a leading edge of a first row of compressor airfoils and a trailing edge of a last row of turbine airfoils is at least 6 meters and a combustion section length between a trailing edge of a last row of compressor airfoils and a leading edge of the first row of turbine blades is less than 1.2 meters.

5. The industrial gas turbine engine of claim 2, wherein an engine output of the industrial gas turbine engine is less than 75 MW.

6. The industrial gas turbine engine of claim 1, wherein an engine output of the industrial gas turbine engine is less than 75 MW.

7. The industrial gas turbine engine of claim 5, further comprising a rotor shaft supported by hydrodynamic bearings.

8. The industrial gas turbine engine of claim 1, wherein the compressor diffuser axially overlaps the can annular combustion assembly.

9. The industrial gas turbine engine of claim 1, wherein the redirecting surface is curved and wherein the curved redirecting surface redirects the axial flow of compressed air more than 90 degrees.

10. The industrial gas turbine engine of claim 1, wherein the redirecting surface is curved and wherein the curved redirecting surface redirects the axial flow of compressed air in a direction essentially parallel to a combustor can longitudinal axis.

11. The industrial gas turbine engine of claim 1, wherein the compressor diffuser redirects compressed air into top hats enclosing the combustors.

12. The industrial gas turbine engine of claim 1, wherein the redirecting surface comprises a conically diverging surface.

13. The industrial gas turbine engine of claim 1, wherein the redirecting surface comprises an arcuately diverging surface, and wherein the diffuser outer wall comprises an arcuately diverging surface.

14. An industrial gas turbine engine, comprising:
   a can annular combustion assembly comprising a plurality of discrete and straight flow ducts configured to receive combustion gas from respective combustors, and an annular chamber configured to merge the flow ducts and deliver the combustion gas directly onto a first row of turbine blades, wherein the can annular combustion assembly accelerates and orients the combustion gas without guide vanes; and
   a radial diffuser positioned at a downstream end of an axial compressor and configured to receive an axial flow of compressed air from the axial compressor, the radial diffuser comprising a diffuser radially outer wall, a diffuser radially inner wall, and a diffuser outlet there between, the diffuser radially inner wall configured to receive the axial flow of compressed air exiting the axial compressor and redirect it radially outward of the annular chamber via a redirecting surface, wherein a downstream end of the redirecting surface is disposed to extend in a radial direction, with respect to a longitudinal axis of the industrial gas turbine engine, beyond a radially inner surface of the annular chamber;

wherein the axial flow of compressed air exiting the downstream end of the axial compressor comprises all compressed air exiting the downstream end of the axial compressor.

15. The industrial gas turbine engine of claim 14, wherein the can annular combustion assembly comprises an acceleration geometry for each flow duct of the plurality of discrete and straight flow ducts that is configured to accelerate the combustion gas to approximately 0.8 mach.

16. The industrial gas turbine engine of claim 14, wherein the redirecting surface comprises an arcuate surface that diverges radially outward toward a downstream end of the radial diffuser, wherein the arcuate surface directs the compressed air into top hats surrounding combustor inlets.

17. The industrial gas turbine engine of claim 16, the arcuate surface comprising a conically diverging surface.

18. The industrial gas turbine engine of claim 14, wherein the industrial gas turbine engine is rated for a maximum output of at least 75 MW.

19. The industrial gas turbine engine of claim 1, wherein each flow duct of the plurality of flow ducts traverses the redirecting surface.

20. The industrial gas turbine engine of claim 1, wherein the redirecting surface is disposed between the diffuser outlet and the annular chamber.

* * * * *